(No Model.)
F. O. CLAFLIN.
COIN OPERATED TOY.
No. 409,923. Patented Aug. 27, 1889.
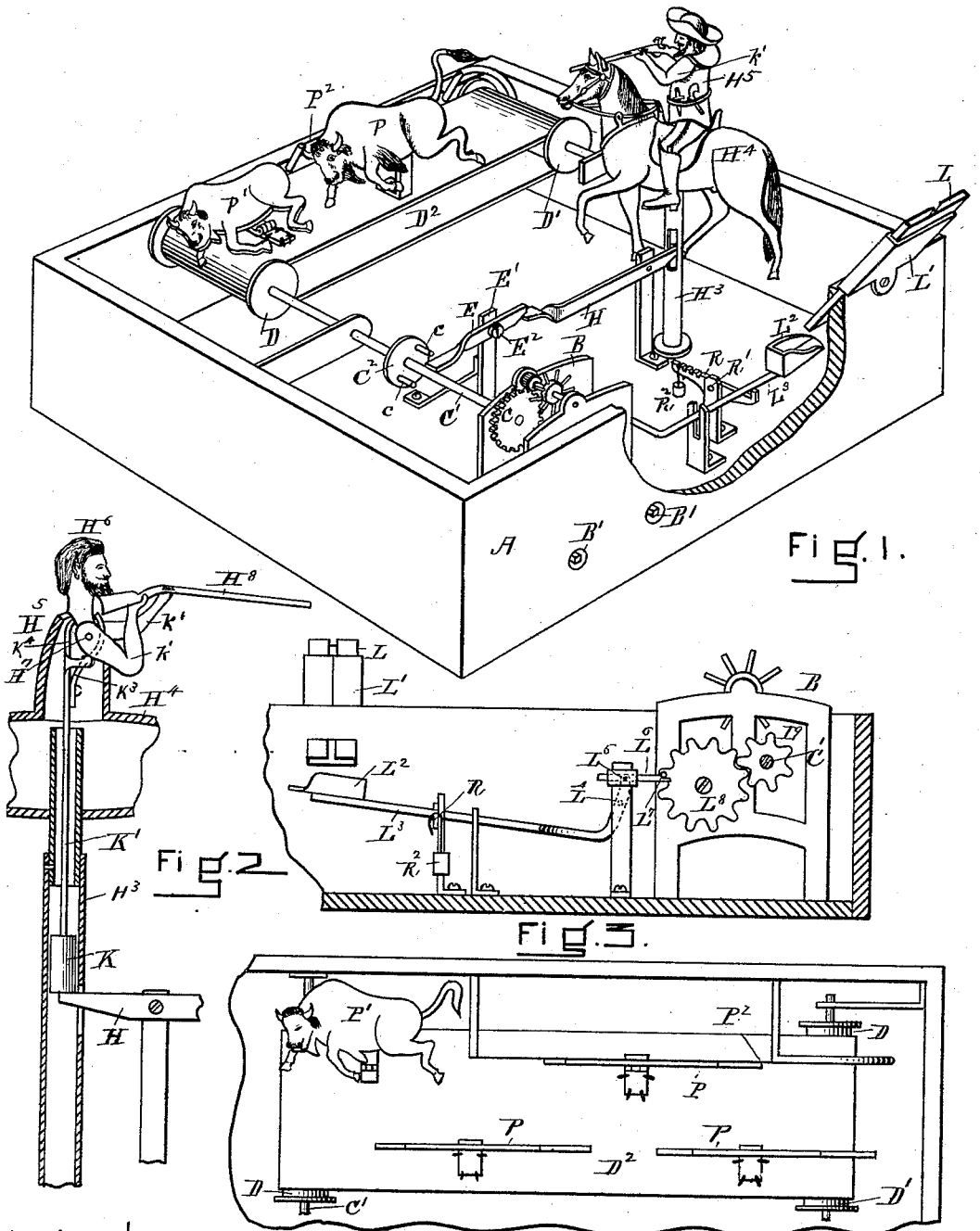
WITNESSES.
Frank G. Parker
Matthew M. Blunt
INVENTOR
Frank O. Claflin

UNITED STATES PATENT OFFICE.

FRANK. O. CLAFLIN, OF BOSTON, MASSACHUSETTS, ASSIGNOR OF ONE-HALF TO THOMAS S. MANN, OF SAME PLACE.

COIN-OPERATED TOY.

SPECIFICATION forming part of Letters Patent No. 409,923, dated August 27, 1889.

Application filed May 22, 1889. Serial No. 311,734. (No model.)

*To all whom it may concern:*

Be it known that I, FRANK. O. CLAFLIN, of Boston, in the county of Suffolk and State of Massachusetts, have invented certain new and useful Improvements in Coin-Operated Mechanical Toys, of which the following, taken in connection with the accompanying drawings, is a specification.

My invention relates to that class of mechanical toys in which several moving figures are so combined with an actuating mechanism that the said figures will seem to act in relation to each other as though the movement of one was caused by a suggestive movement of the other or others, the motive power of the device being derived from springs acting through a train of gears, levers, &c., the starting device being actuated by the dropping of a coin through an orifice made for the purpose.

A full understanding of the invention may be had by an examination of the annexed specification and accompanying drawings, in which—

Figure 1 is a perspective view showing in general figures and the mechanism for giving motion to them. Fig. 2 is a vertical section showing a part of a figure representing a hunter on horseback, the platform or table being shown as removed for the purpose of showing the interior mechanism. Fig. 3 shows details in elevation, and Fig. 4 is a plan showing a part of my invention.

In Fig. 1, A represents the casing, which serves as a convenient base for holding the mechanism required, and it also serves to hold the platform or table upon which the figures are mounted and displayed.

B, Figs. 1 and 3, indicates a clock-movement which serves to give the required motion to the several figures. The movement may be actuated by ordinary clock-springs and wound up by a key which fits the arbors B' B', Fig. 1.

The gear-wheel C, Fig. 1, gives motion to the shaft C', Figs. 1, 3, and 4. Upon the shaft C', I have a cylinder D, about which an endless belt $D^2$ traverses. This belt $D^2$ is supported at the end opposite the cylinder D by the rotating cylinder D'. (See Figs. 1 and 4.) Upon the belt $D^2$, I mount a number of representations of animals P P'—buffalo, for instance—some of which are so fixed that they cannot fall over, while others will fall if not supported by the guard $P^2$. In the drawings, Fig. 1, I have shown but two animals, one of which P' falls over onto its side unless it is supported by the guard $P^2$.

In the plan Fig. 4 I have shown a number of figures of animals P P', one P' of which is represented as fallen down as though shot and killed by the hunter. It is not essential to my invention to have the animals P P' mounted upon an endless belt, as they could be moved by other means—a turning table, for instance.

The hunter $H^5$ is shown as mounted upon a horse $H^4$, Figs. 1 and 2, both being mounted upon a hollow post $H^3$. The hunter $H^5$ is represented as holding his gun $H^8$ by his arms $k'$ $k'$. Movement is given to the hunter's head $H^6$ and to his arms $k'$ $k'$ and gun $H^8$ by the following-described device: The shaft C' has upon it a disk $C^2$, that rotates with it. The disk $C^2$ has pins $c$ $c$ extending from it, which, as the disk $C^2$ rotates, come in contact with the lever E (pivoted to the post E' at $E^2$) and cause it to move, and through it the lever H, weight K, rod K', $K^3$, $K^4$ give motion to the head, arms, and gun of the hunter, as shown in Fig. 2. The head $H^6$, as well as the arms $k'$ $k'$ of the hunter, is pivoted at $H^7$, the head and arms being so balanced that they will drop forward and down when the rod K' $K^3$ $K^4$ is lowered, and of course will rise again when the rod moves upward.

The starting and stopping device of my apparatus is shown in full in Fig. 3, and consists of the gear-wheels $L^9$, affixed to the shaft C', together with the gear-wheel $L^8$, pin $L^7$, sliding rod $L^6$, lever $L^3$, and coin-box $L^2$, the action of which is as follows: The lever $L^3$ is held in its normal position by the weighted lever R, the lever R being pivoted at R' (see Fig. 1) and provided with a weight $R^2$, which may be moved on the lever R for the purpose of adapting it to support the lever $L^3$ and balancing the stop device in such a manner that a coin dropped into the box $L^2$ will cause the lever $L^3$ to swing on its pivot $L^4$, and, acting through the pin $L^5$, withdraw the slide $L^6$ from the path of the stopping-pin $L^7$, and thus set the device in operation. When the pin $L^7$ is free, the whole apparatus is set in motion and will continue to move until the wheel $L^8$ has made a full rotation, by which time the box $L^2$ on the lever $L^3$ will have moved downward, so as to allow the coin to fall out of it. Then the lever will at once regain its normal position and the slide $L^6$ will return to a position in which it will engage with the pin $L^7$ and stop the apparatus.

The coin-slide L, Figs. 1 and 3, is made so that it can be readily removed, as it is fitted into a casing $L'$ and held by friction only.

In practice I make my device with a glass top and sides and have the platform represented as a prairie or field.

I claim—

1. In a mechanical toy set in operation by the dropping of a coin, the combination of the toy hunter having movable arms and head and the gun $H^8$, and mechanism for giving motion to said parts, with the moving animal figures and mechanism for giving motion to said figures, substantially as and for the purpose set forth.

2. In a mechanical toy set in operation by the dropping of a coin, having a figure of a hunter and figures of animals, some of said figures of animals being adapted to fall at fixed intervals, the combination of the mechanism for operating said figures with the stop device consisting of the stop-pin $L^7$, lever $L^3$, and coin-box $L^2$, substantially as and for the purpose set forth.

In testimony whereof I have signed my name to this specification, in the presence of two subscribing witnesses, on this 20th day of May, A. D. 1889.

FRANK. O. CLAFLIN.

Witnesses:
FRANK G. PARKER,
MATTHEW M. BLUNT.